United States Patent
Scuderi (10) Patent No.: US 11,339,712 B1
(45) Date of Patent: May 24, 2022

(54) BOTTOMING CYCLE POWER SYSTEM

(71) Applicant: Salvatore C. Scuderi, Westfield, MA (US)

(72) Inventor: Salvatore C. Scuderi, Westfield, MA (US)

(73) Assignee: SCUDERI GROUP, INC., West Springfield, MA (US)

( * ) Notice: Subject to any disclaimer, the term of this patent is extended or adjusted under 35 U.S.C. 154(b) by 0 days.

(21) Appl. No.: 17/358,197

(22) Filed: Jun. 25, 2021

(51) Int. Cl.
*F02C 1/05* (2006.01)
*F02C 6/00* (2006.01)
(Continued)

(52) U.S. Cl.
CPC .............. *F02C 1/05* (2013.01); *F01K 9/003* (2013.01); *F01K 23/065* (2013.01); *F01N 3/005* (2013.01); *F01N 5/04* (2013.01); *F02B 39/085* (2013.01); *F02B 41/10* (2013.01); *F02C 6/006* (2013.01); *F02G 5/02* (2013.01); *F01N 2240/22* (2013.01); *F02B 35/00* (2013.01); *F02B 63/042* (2013.01);
(Continued)

(58) Field of Classification Search
CPC ...... F02B 39/085; F02B 35/00; F02B 63/042; F02B 41/10; F01K 19/04; F01K 9/003; F01K 23/065; F02C 1/05; F02C 6/006; F05D 2220/30; F05D 2220/62; F05D 2220/76; F05D 2220/764; F05D 2260/10; F02G 5/02; F01N 3/005; F01N 5/04; F01N 2240/22; F25B 15/06; F25B 25/02; F25B 27/02; Y02A 30/274; Y02B 30/625; Y02T 10/12
See application file for complete search history.

(56) References Cited

U.S. PATENT DOCUMENTS 8,888,895 B1    11/2014    Fisher et al.
10,151,498 B2    12/2018    Moghaddam et al.
(Continued)

OTHER PUBLICATIONS

Kennedy, et. al., Inverted Brayton Cycle With Exhaust Gas Condensation, Journal of Engineering for Gas Turbines and Power, vol. 140 /111702-1, Nov. 2018.
(Continued)

*Primary Examiner* — Audrey B. Walter
*Assistant Examiner* — Dapinder Singh
(74) *Attorney, Agent, or Firm* — Heslin Rothenberg Farley & Mesiti, P.C.

(57) ABSTRACT

A bottoming cycle power system includes a turbine generator and an open cycle absorption system. The turbine-generator includes a turbo-expander and turbo-compressor disposed on a turbo-crankshaft. The turbo-expander is operable to rotate the turbo-crankshaft as a flow of exhaust gas from a combustion process passes through the turbo-expander. The turbo-compressor is operable to compress the flow of exhaust gas after the exhaust gas passes through the turbo-expander. The open cycle absorption chiller system includes an absorber section that is operable to receive the flow of exhaust gas from the turbo-expander. The absorber section includes a first refrigerant solution that is operable to absorb water from the exhaust gas as the exhaust gas passes through the first refrigerant solution. The absorber section is also operable to route the flow of exhaust gas to the turbo-compressor after the flow of exhaust gas has passed through the first refrigerant solution.

24 Claims, 5 Drawing Sheets

(51) Int. Cl.
*F01K 23/06* (2006.01)
*F01K 9/00* (2006.01)
*F01N 5/04* (2006.01)
*F02B 41/10* (2006.01)
*F02B 39/08* (2006.01)
*F02G 5/02* (2006.01)
*F01N 3/00* (2006.01)
*F25B 15/06* (2006.01)
*F02B 35/00* (2006.01)
*F02B 63/04* (2006.01)
*F25B 25/02* (2006.01)
*F25B 27/02* (2006.01)

(52) U.S. Cl.
CPC ...... *F05D 2220/30* (2013.01); *F05D 2220/62* (2013.01); *F05D 2220/76* (2013.01); *F05D 2220/764* (2013.01); *F05D 2260/10* (2013.01); *F25B 15/06* (2013.01); *F25B 25/02* (2013.01); *F25B 27/02* (2013.01); *Y02A 30/274* (2018.01); *Y02B 30/625* (2013.01); *Y02T 10/12* (2013.01)

(56) References Cited

U.S. PATENT DOCUMENTS

| | | | |
|---|---|---|---|
| 2007/0234721 A1* | 10/2007 | Vuk | F01N 5/04 60/608 |
| 2009/0031999 A1* | 2/2009 | Erickson | F02B 29/0443 123/563 |
| 2010/0101454 A1* | 4/2010 | Wendelin | B01F 3/1221 106/243 |
| 2016/0096287 A1* | 4/2016 | Weigerstorfer | B29B 9/06 241/30 |
| 2019/0120131 A1 | 4/2019 | Scuderi | |

OTHER PUBLICATIONS

Precision Combustion, Inc., DOE Award No. DE-SC0017221, High-Efficiency Post Combustion Carbon Capture System, National Carbon Capture Center Test 2020.

Brunetti, et al., Membrane condenser as emerging technology for water recovery and gas pre-treatment: current status and perspectives, BMC Chemical Engineering, https://doi.org/10.1186/s42480-019-0020-x, Sep. 12, 2019.

\* cited by examiner

BOTTOMING CYCLE POWER SYSTEM

TECHNICAL FIELD

The present disclosure relates to systems for delivering power. More specifically, the disclosure relates to a bottoming cycle power system for delivering power, such as mechanical or electrical power.

BACKGROUND

One of the most challenging aspects of today's energy technologies is to effectively convert waste heat from a combustion process into useable power. Such power can be in the form of electrical or mechanical power for use in stationary and/or mobile applications.

Methods of converting waste heat into useful forms of energy are commonly referred to as bottoming cycles. Systems that utilize a bottoming cycle to provide power are referred to herein as bottoming cycle power systems.

Systems that utilize a fuel combustion process in an internal combustion engine (such as a piston engine or a turbine engine) as the motive force to drive a crankshaft for providing power are referred to herein as primary power systems. In most primary power systems the efficiency of the system ranges from below 30% to a high of almost 50%. This means that the majority of energy contained in the fuel is lost in the form of heat to the atmosphere through either the cooling circuit or exhaust of the internal combustion engine.

However, the waste energy or exhaust gas from the internal combustion engine of a primary power system may be utilized as the energy input for a bottoming cycle power system. If enough useful work can be recovered from such a bottoming cycle power system, the bottoming cycle power system could then be used to supplement the output of the primary power system for a more efficient overall combined power system output.

Some bottoming cycle power systems include a turbo-expander that receives a flow of exhaust gas from a combustion process, such as from a combustion process of an internal combustion engine. The exhaust gas carries a significant amount of energy. However, the flow of exhaust gas is typically only at, or slightly above, atmospheric pressure. For example, the exhaust pressure may be only a few pounds per square inch (psi) above atmospheric pressure. This makes recovering useful work difficult.

In some bottoming cycle power systems, the exhaust gas flows through a turbo-expander where it typically exits the turbo-expander at below atmospheric pressures (or vacuum pressures). The vacuum pressures are caused by a compression turbine (or turbo-compressor). That is, the turbo-compressor is in fluid communication with the exit/output side of the turbo-expander and is operable to pull a vacuum on the output side of the turbo-expander as the exhaust gas flows from the turbo-expander to the turbo-compressor. Thereafter, the exhaust gas enters the turbo-compressor where it is pumped back to atmospheric pressure and discharged to the atmosphere. The amount of energy recovered from such a bottoming cycle power system is the energy produced by the turbo-expander minus the energy consumed by the turbo-compressor. Therefore, the less work needed by the turbo-compressor to compress the expanded volume of exhaust gas, the higher the net-work produced from the bottoming cycle power system.

Various prior art cooling systems may be utilized to reduce the volume (or specific volume) of exhaust gas prior to entering the turbo-compressor of a bottoming cycle power system and therefore, reduce the amount of work required by the turbo-compressor to compress the exhaust gas. Problematically however, these cooling systems consume a significant amount of energy due to pumps and/or other energy consuming devices needed to circulate coolants through the cooling system. Additionally, such cooling systems often require a significant pressure differential for the exhaust gas to flow through, therefore reducing the amount of vacuum that the turbo-compressor can pull on the turbo-expander.

Moreover, the more the exhaust gas is cooled in order to produce as much net-work required of the turbo-compressor of a bottoming cycle power system as possible, the more the density of the cooled exhaust gas will increase. Problematically, if the exhaust gas is cooled to ambient or near ambient temperatures, the exhaust gas will become too dense to flow up the required stack of the internal combustion engine. In that case, the exhaust gas must be re-heated as it exits the turbo-compressor, which may significantly reduce the amount of net-work that the bottoming cycle power system can provide.

Further, the exhaust gas of an internal combustion engine contains a significant amount of water vapor as a naturally occurring by-product of the combustion process. Problematically, the water vapor has a relatively high specific volume and mass, which causes an unwanted burden on the compression work of the turbo-compressor in the bottoming cycle power system.

Additionally, the exhaust gas of an internal combustion engine contains a significant amount of undesirable carbon dioxide, which is a significant greenhouse gas. Problematically, prior art carbon dioxide capture systems generally consume a significant amount of energy to remove the carbon dioxide from the exhaust gas, which would also cause a burden on the efficiency of the internal combustion engine. Also problematically, the significant amount of water in the exhaust gas may interfere with the carbon dioxide capture process, making the carbon dioxide capture process less efficient and more costly.

Accordingly, there is a need for a bottoming cycle power system wherein the specific volume of flow of exhaust gas is significantly and efficiently reduced with as little pressure drop as possible after exiting the turbo-expander and prior to entering the turbo-compressor. Also, there is a need to reduce the work required of the turbo-compressor in a bottoming cycle power system to increase the overall efficiency of that bottoming cycle power system. Further there is a need to efficiently decrease the volume and mass of water vapor in a flow of exhaust gas prior to entering the turbo-compressor of a bottoming cycle power system. Moreover, there is a need to capture carbon dioxide in a flow of exhaust gas from a bottoming cycle power system with as little energy consumption as possible. Additionally, there is a need to maintain the temperature of the exhaust gas from a bottoming cycle power system above a temperature that will enable the exhaust gas to readily flow up its associated stack.

BRIEF DESCRIPTION

The present disclosure offers advantages and alternatives over the prior art by providing a bottoming cycle power system, which includes a turbo-expander and a turbo-compressor. The turbo-expander expands exhaust gas from a combustion process (such as a primary power system) as the exhaust gas passes through the turbo-expander. The turbo-compressor pulls a vacuum on the exhaust gas on the exit side of the turbo-expander in order to increase the pressure differential across the turbo-expander. The specific volume of flow of exhaust gas is significantly and efficiently reduced with as little pressure drop as possible after exiting the turbo-expander and prior to entering the turbo-compressor. The bottoming cycle power system also includes an open cycle absorption chiller system, which is uniquely utilized to cool the exhaust gas and to remove water from the exhaust gas. A recycled plastic processing system is also uniquely used to further cool the exhaust gas. An exhaust gas heat exchanger is uniquely used to further cool the exhaust gas prior to entering the turbo-compressor and to reheat the exhaust gas after it exits the turbo-compressor so that the exhaust gas readily flows up a stack associated with the combustion process. A carbon dioxide capture system is used to remove carbon dioxide from the dry exhaust gas after the flow of exhaust gas has passed through the open cycle absorption chiller system and the turbo-compressor.

A bottoming cycle power system in accordance with one or more aspects of the present disclosure includes a turbine generator and an open cycle absorption system. The turbine-generator includes a turbo-expander and turbo-compressor disposed on a turbo-crankshaft. The turbo-expander is operable to rotate the turbo-crankshaft as a flow of exhaust gas from a combustion process passes through the turbo-expander. The turbo-compressor is operable to compress the flow of exhaust gas after the exhaust gas passes through the turbo-expander. The open cycle absorption chiller system includes an absorber section that is operable to receive the flow of exhaust gas from the turbo-expander. The absorber section includes a first refrigerant solution that is operable to absorb water from the exhaust gas as the exhaust gas passes through the first refrigerant solution. The absorber section is also operable to route the flow of exhaust gas to the turbo-compressor after the flow of exhaust gas has passed through the first refrigerant solution.

A combined power system in accordance with one or more aspects of the present disclosure includes a primary power system, a bottoming cycle power system and an open cycle absorption system. The primary power system includes an internal combustion engine having a rotatable crankshaft. The engine is operable to use fuel in a combustion process to deliver primary power to the engine crankshaft. The combustion process produces a flow of exhaust gas. The bottoming cycle power system includes a turbine-generator. The turbine generator includes a turbo-expander and turbo-compressor disposed on a turbo-crankshaft. The turbo-expander is operable to rotate the turbo-crankshaft as the flow of exhaust gas from the combustion process passes through the turbo-expander. The turbo-compressor is operable to compress the flow of exhaust gas after the exhaust gas passes through the turbo-expander. The open cycle absorption chiller system includes an absorber section that is operable to receive the flow of exhaust gas from the turbo-expander. The absorber section includes a first refrigerant solution that is operable to absorb water from the exhaust gas as the exhaust gas passes through the first refrigerant solution. The absorber section is also operable to route the flow of exhaust gas to the turbo-compressor after the flow of exhaust gas has passed through the first refrigerant solution.

A recycled plastic processing system in accordance with one or more aspects of the present disclosure includes an extruder. The extruder includes a hopper section, an auger mechanism and an extruder heat exchanger system. The hopper section is operable to receive solid recyclable plastic material therein. The auger mechanism is operable to receive the solid recyclable plastic material from the hopper section and to compress the solid recyclable plastic material therein. The extruder heat exchanger system is operable to receive a flow of exhaust gas from a combustion process. The extruder heat exchanger system is also operable to remove heat from the flow of exhaust gas and to melt the solid recyclable plastic material in the auger mechanism to provide a flow of molten recyclable plastic material as the recyclable plastic material passes through the auger mechanism and as the exhaust gas passes through the extruder heat exchanger system.

An open cycle absorption chiller system in accordance with one or more aspects of the present disclosure includes an absorber section operable to receive a flow of exhaust gas from a combustion source. The absorber section includes a first refrigerant solution operable to absorb water from the exhaust gas as the exhaust gas passes through the first refrigerant solution. The absorber section is operable to route the flow of exhaust gas out of the absorber section after the flow of exhaust gas has passed through the first refrigerant solution.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
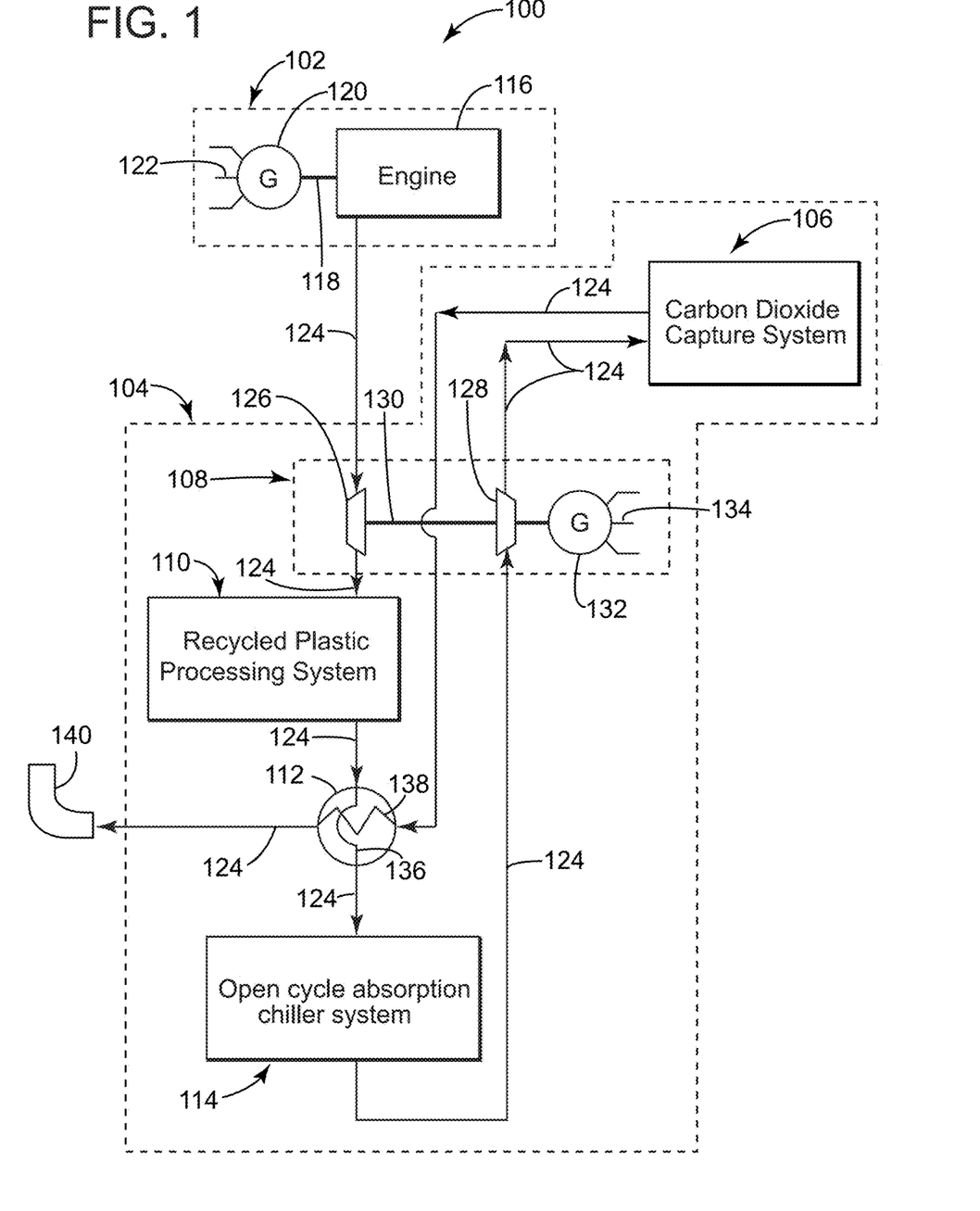
FIG. 1 depicts a schematic of an example of a combined power system having a primary power system and a bottoming cycle power system, wherein the bottoming cycle power system includes a turbine generator, a recycle plastic processing system, an exhaust gas heat exchanger, an open cycle absorption chiller system and a carbon dioxide capture system, in accordance with the present disclosure.

Referring to FIG. 1, a schematic is depicted of an example of a combined power system 100 having a primary power system 102 and a bottoming cycle power system 104, in accordance with the present disclosure. The bottoming cycle power system 104 includes a turbine generator 108, a recycle plastic processing system 110, an exhaust gas heat exchanger 112, an open cycle absorption chiller system 114 and a carbon dioxide capture system 106, in accordance with the present disclosure.

In this specific example, the combined power system 100, primary power system 102 and bottoming cycle power system 104 are configured to generate electrical power to, for example, a grid (i.e., an interconnected network for delivering electricity from producers to consumers). However, it is within the scope of the present disclosure, that the power systems 100, 102 and 104 could be used to provide mechanical power as well.

Moreover, such power systems of the present disclosure may be used in both stationary applications and mobile applications. Examples of such stationary applications include electric generator systems for delivering electric power to a grid, electric generator systems for delivering electric power to a building, mechanical power systems for delivering mechanical power for an industrial manufacturing process or the like. Examples of such mobile applications include mechanical power systems for delivering mechanical power to a motor vehicle, electrical power systems for delivering electrical power to an electric vehicle or the like.

The primary power system 102 includes an internal combustion engine 116 having an engine crankshaft 118 that is operatively connected to a primary electric generator 120. The internal combustion engine 116 may include a turbine engine, a piston engine or similar. The engine 116 utilizes fuel in a combustion process as the motive force that rotates the engine crankshaft 118 and the primary electric generator 120 to generate a first electrical output 122. Additionally, the combustion process produces a flow of exhaust gas 124, which may be routed to the bottoming cycle power system 104. The flow of exhaust gas 124 from the combustion process of the internal combustion engine 116 may be at, or near, atmospheric pressure and may have a temperature in the range of 850 to 950 degrees Fahrenheit (F).

Though in this example, the combustion process and associated flow of exhaust gas 124 is utilized within a primary power system 102, other devices and/or systems may utilize a combustion process to produce exhaust gas 124. For example, the exhaust gas 124 may be produced from a furnace system, or from burning natural gas at an oil well site or the like.

The bottoming cycle power system 104 includes the turbine generator 108. The turbine generator 108 includes a turbo-expander 126 and turbo-compressor 128 disposed on a turbo-crankshaft 130. The turbo-expander 126 is operable to rotate the turbo-crankshaft 130 as the flow of exhaust gas from a combustion process (such as, for example, the combustion process generated from internal combustion engine 116) passes through the turbo-expander 126.

The turbo-expander 126 expands the exhaust gas 124 to extract energy from the exhaust gas 124 and convert the energy to work on the crankshaft 130. Because the exhaust gas 124 is expanded as it passes through the turbo-expander 126, and because the turbo-compressor 128 is operable to pull a vacuum on the exit or output side of the turbo-expander 126, the exhaust gas 124 may be under a vacuum as it exits the turbo-expander 126. For example, the exhaust gas 124 may be at a vacuum pressure of perhaps 0.2 atmospheres as it exits the turbo-expander 126. Additionally, the exhaust gas 124 will cool as it performs work on the crankshaft 130, for example within a range of 500-700 degrees F.

The turbo-compressor 128 (typically a turbine compressor or similar) is operatively connected to the flow of exhaust gas 124. More specifically, as the turbo-compressor 128 is rotated by the turbo-crankshaft 130, the turbo-compressor 128 is operable to compress the flow of exhaust gas 124 after the exhaust gas passes through the turbo-expander 126, the recycled plastic processing system 110, the exhaust gas heat exchanger 112 and the open cycle absorption system 114.

Moreover, the turbo-compressor 128 pulls a vacuum on the output side of the turbo-expander 126 (for example a vacuum of about 0.2 atmospheres) to increase a pressure difference across the turbo-expander 126. The increased pressure difference enhances the expansion of the flow of exhaust gas 124 through the turbo-expander 126 in order to enhance the conversion of energy in the exhaust gas 124 into usable work on the turbo-crankshaft 130.

A bottoming cycle generator 132 is also disposed on the turbo-crankshaft 130. The bottoming cycle generator 132 is operable to generate electrical power when the turbo-crankshaft 130 is rotated by the turbo-expander 126. In other words, the bottoming cycle generator 132 generates a second electrical output 134 that may be used to supplement the first electrical output 122 of the primary power system 102.

The exhaust gas 124 may flow from the turbo-expander 126 into the recycled plastic processing system 110. The recycled plastic processing system 110 is operable to receive the flow of exhaust gas 124 from the turbo-expander 126 and to route the flow of exhaust gas 124 to the open cycle absorption system 114. The recycled plastic processing system 110 is operable to remove heat from the flow of exhaust gas 124 with very little pressure drop.

Advantageously, the recycled plastic processing system 110 cools the exhaust gas 124 and increases the density of the exhaust gas 124, which reduces the amount of work required of the turbo-compressor 128 to pump the exhaust gas 124 back to atmospheric pressures. Additionally, because the flow of exhaust gas 124 encounters very little pressure drop through the recycled plastic processing system 110, the vacuum pressure at the output side of the turbo-expander 126, as well as the pressure differential across the turbo-expander 126, is largely maintained. Therefore, the enhanced work output of the turbo-expander 126 is also maintained.

With the enhanced work output of the turbo-expander 126 and the reduced amount of work required from the turbo-compressor 128, the second electrical output 134 may be large enough to provide a portion of, or all of, the electrical power to operate the recycled plastic processing system 110, the open cycle absorption chiller system 114 and/or the carbon dioxide capture system 106. For example, the bottoming cycle generator 132 may be operable to generate electrical power to operate all of, or a portion of, the recycled plastic processing system 110 when the turbo-crankshaft 130 is rotated by the turbo-expander 126. Also, the bottoming cycle generator 132 may be operable to generate electrical power to operate all of, or a portion of, the open cycle absorption chiller system 114 when the turbo-crankshaft 130 is rotated by the turbo-expander 126. Also, the bottoming cycle generator 132 may be operable to generate electrical power to operate all of, or a portion of, the carbon dioxide capture system 106 when the turbo-crankshaft 130 is rotated by the turbo-expander 126. Also, the bottoming cycle generator 132 may be operable to generate electrical power to operate all of, or a portion of, any combination of the recycled plastic processing system, the open cycle absorption chiller system 114 and the carbon dioxide capture system when the turbo-crankshaft 130 is rotated by the turbo-expander 126.

Also advantageously and as will be explained in greater detail herein, the heat removed from the flow of exhaust gas 124 may be used by the recycled plastic processing system 110 to melt solid recyclable plastic materials 308 to provide a flow of molten recyclable plastic material 310 (see FIG. 5). The molten recyclable plastic material 310 is operable to be cooled into a solid recycled plastic product 312 (see FIG. 5), such as bottles 312A, furniture 312B, clothing 312C or the like. By utilizing waste heat energy from the flow of exhaust gas 124, rather than generating heat energy from other more traditional primary sources of energy (such as electricity, natural gas, coal or the like), to melt such recyclable plastic materials 308, the cost of providing recycled plastic products 312 is greatly reduced. Moreover, the cost of providing such recycled plastic products 312 utilizing energy from the exhaust gas 124 in the recycled plastic processing system 110 may be reduced below the cost of producing those equivalent products as new, non-recycled products. Therefore, the incentive to recycle plastic, instead of dispose of plastic in, for example, landfills, may be greatly enhanced in general.

The recycled plastic processing system 110 may be advantageously disposed within the bottoming cycle power system 104 such that it receives the flow of exhaust gas 124 directly from the turbo-expander 126 and prior to the exhaust gas entering either the exhaust gas heat exchanger 112 or the open cycle absorption chiller system 114. This is because, the exhaust gas heat exchanger 112 and the open cycle absorption chiller system 114 both cool the exhaust gas 124 further, which, in some cases, may drop the temperature of the exhaust gas 124 below the melting point of some recyclable plastic materials 308. Additionally, by disposing the recycled plastic processing system 110 in the flow of exhaust gas upstream of the exhaust gas heat exchanger 112 and the open cycle absorption chiller system 114, both the exhaust gas heat exchanger 112 and the open cycle absorption chiller system 114 may be downsized significantly.

From the recycled plastic processing system 110, the exhaust gas 124 may flow into the exhaust gas heat exchanger 112. The exhaust gas heat exchanger 112 includes a first flow path 136 and a second flow path 138 operable to exchange heat therebetween. More specifically, the first flow path 136 is operable to transfer heat into the second flow path 138. The first flow path 136 is operable to receive the flow of exhaust gas 124 from the turbo-expander 126 prior to the exhaust gas 124 being compressed by the turbo-compressor 128. More specifically in this example illustrated in FIG. 1, the first flow path 136 is operable to receive the flow of exhaust gas 124 from the turbo-expander 126 after the exhaust gas has passed through the recycled plastic processing system 110. The second flow path 138 is operable to receive the flow of exhaust gas 124 from the turbo-compressor 128 after the exhaust gas 124 has been compressed by the turbo-compressor 128. More specifically in this example illustrated in FIG. 1, the second flow path 138 is operable to receive the flow of exhaust gas 124 from the turbo-compressor 128 after it has passed through the carbon dioxide capture system 106.

The hot exhaust gas 124 from the turbo-expander 126 (for example at about a temperature of 500-700 degrees F.) or from the recycled plastic processing system (for example at about 300-400 degrees F.), that flows through the first flow path 136 of the exhaust gas heat exchanger 112, is cooled by the much cooler exhaust gas 124 (for example at about a temperature range of 60-80 degrees F.) from the turbo-compressor 128, that flows through the second flow path 138 of the exhaust gas heat exchanger 112. Advantageously, the cooled exhaust gas 124 from the turbo-compressor 128 provides a stage of cooling for the hotter exhaust gas 124 from the turbo-expander 126. For example, the exhaust gas 124 may be cooled down to about a range of 200-300 degrees F. as it exits the first path 134 of the exhaust gas heat exchanger 112.

Also, advantageously, the hotter exhaust gas 124 from the turbo-expander 126 or recycled plastic processing system 110 reheats the cooler exhaust gas 124 from the turbo-compressor 128 to temperatures that enable the exhaust gas 124 to flow readily up a stack 140 of the combined power system 100. For example, the exhaust gas 124 exiting the second path 136 of the gas heat exchanger 112 may be within a range of about 150-250 degrees F.

The stack 140, as used herein, will refer to the extended exhaust piping system designed to route exhaust gas away from the source of the combustion process (in this example, the source of the combustion process is the internal combustion engine 116). In this example, the stack 140 of the combined power system 100 is designed to route the flow of exhaust gas 124 away from the combined power system 100 after the exhaust gas exits the second flow path 138 of the exhaust gas heat exchanger 112).

The stack 140 of the combined power system 100 is utilized to route the exhaust gas 124 away from the combined power system 100 and to maintain air quality in the proximity of the combined power system 100. The stack 140, often by regulation, may have a minimum height that may be as much as 1.5 times the height of a building or container that houses the engine 116 or more. If the exhaust gas 124 is too cool (for example, near or below ambient temperature), the exhaust gas 124 will be too dense to readily flow to the top of the stack 140. Cooling the exhaust gas 124 to near ambient temperature before it enters the turbo-compressor 128 is advantageous for increasing the compression ratio (and therefore efficiency) across the turbo-expander 126. However, reheating the exhaust gas 124 to temperatures that are significantly higher than ambient temperature after the exhaust gas 124 exits the turbo-compressor 128 is advantageous for routing the exhaust gas 124 up the stack 140. The exhaust gas heat exchanger 112 helps to perform both of these functions.

The open cycle absorption chiller system 114 is operable to receive, cool and remove water from the flow of exhaust gas 124 after the exhaust gas 124 has passed through the first flow path 136 of the exhaust gas heat exchanger 112 and prior to the exhaust gas 124 being compressed by the turbo-compressor 128. The open cycle absorption chiller system 114 provides another stage of cooling for the exhaust gas 124, and additionally removes a significant amount of water from the exhaust gas 124, prior to the exhaust gas 124 entering the turbo-compressor 128.

The carbon dioxide capture system 106 is operable to remove and capture carbon dioxide 206 from the exhaust gas 124 after the exhaust gas 124 exits the turbo-compressor 128 and prior to the exhaust gas 124 flowing through the second flow path 138 of the exhaust gas heat exchanger 112. As will be explained in greater detail herein, the carbon dioxide capture system 106 is also operable to advantageously regenerate the captured carbon dioxide 206 using a heat of compression of a carbon dioxide compressor 220 (see FIG. 4).

Figure 2:
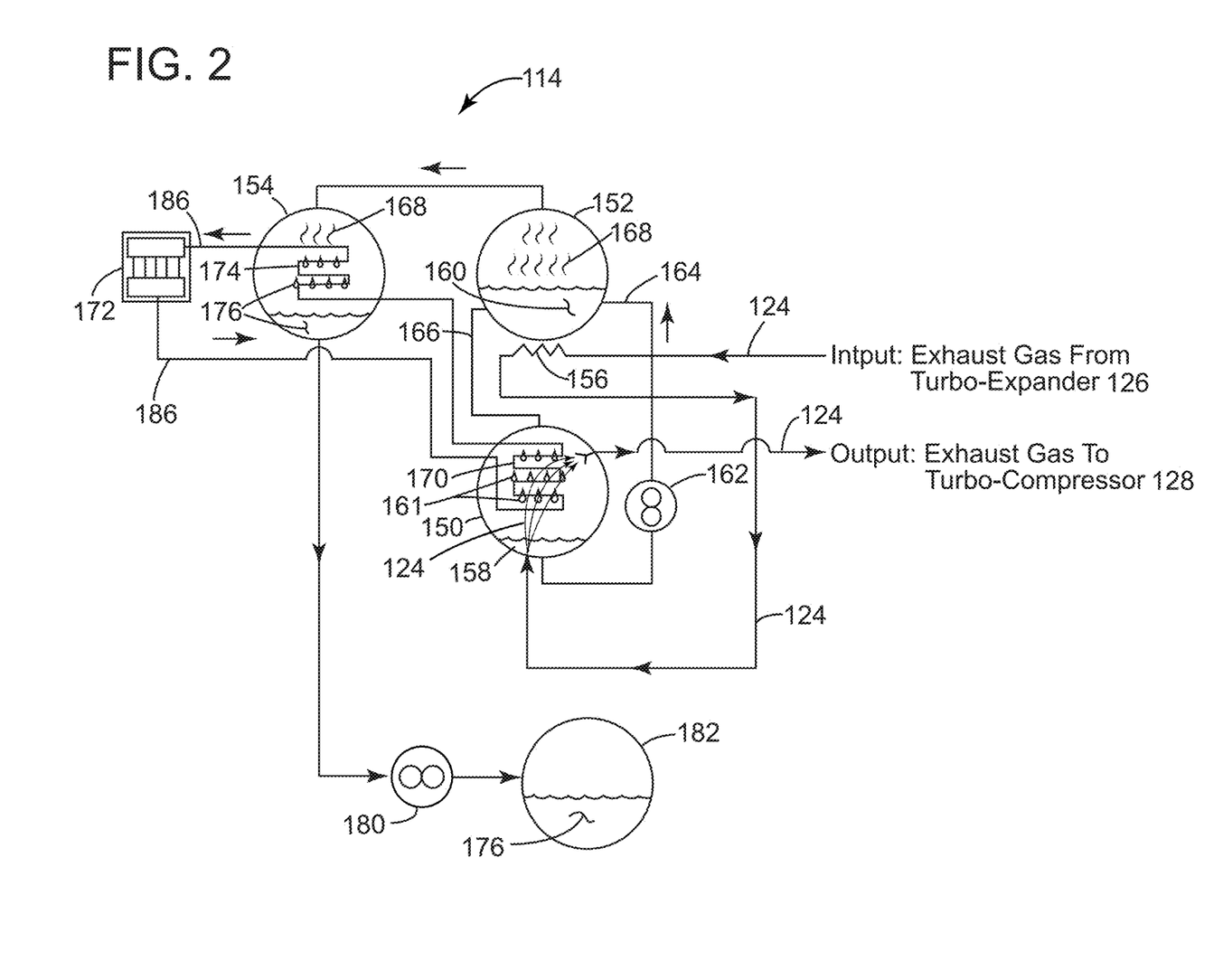
FIG. 2 depicts a schematic of an example of a detailed view of the open cycle absorption chiller system of FIG. 1, in accordance with the present disclosure.

Referring to FIG. 2, a schematic is depicted of an example of a detailed view of the open cycle absorption chiller system 114, in accordance with the present disclosure. The open cycle absorption chiller system 114 has an absorber section 150, a generator section 152 and a condenser section 154 all in fluid communication with each other and operable to route a flow of water as a refrigerant therethrough. In the open cycle absorption chiller system 114, the exhaust gas 124 first flows into a generator section heat exchanger 156 of the generator section 152 where the exhaust gas 124 is cooled. The exhaust gas 124 then exits the generator section 152 and flows into the absorber section 150 where the exhaust gas 124 is dried, i.e., water is removed from the exhaust gas 124.

The absorber section 150 is operable to receive the flow of exhaust gas 124 from the turbo-expander 126. More specifically, the absorber section 150 is operable to receive the flow of exhaust gas 124 from the generator section heat exchanger 156 after it has been cooled by the generator section 152. The absorber section 150 includes a first refrigerant solution 158 of water and a hygroscopic substance such as, for example, salt. The salt may be lithium bromide, lithium chloride or the like. The first refrigerant solution 158 is operable to absorb water from the exhaust gas 124 as the exhaust gas passes through the first refrigerant solution 158. The absorber section 150 is also operable to route the flow of exhaust gas 124 to the turbo-compressor 128 after the flow of exhaust gas 124 has passed through the first refrigerant solution 158.

The hygroscopic material in the first refrigerant solution 158 acts as a strong desiccant which removes a significant portion of water from the exhaust gas 124. The water from the exhaust gas, in turn, increases the concentration of water in the first refrigerant solution 158, wherein the water functions as a refrigerant in the first refrigerant solution 158. More specifically, due to the high concentration of hygroscopic material in the first refrigerant solution 158, the absorber section 150 is advantageously operable to reduce the concentration of water in the flow of exhaust gas 124 to no more than 5.0 percent by weight, to no more than 2.5 percent by weigh and/or to no more than 0.5 percent by weight before the flow of exhaust gas 124 exits the absorber section 150 and/or before the flow of exhaust gas 124 enters the turbo-compressor 128.

By advantageously reducing the content of water in the exhaust gas 124 to these concentrations, both the mass and volume of the flow of exhaust gas 124 is significantly reduced, which further reduces work required of the turbo-compressor 128 and increases the overall efficiency of the bottoming cycle power system 104. Further, by advantageously reducing the content of water in the exhaust gas 124 to these concentrations, the efficiency of the carbon dioxide capture system 106 is significantly increased. This is because water interferes with the absorption of carbon dioxide 206 in the carbon dioxide capture system 106.

The generator section 152 is operable to contain a second refrigerant solution 160, which is in fluid communication with the first refrigerant solution 158 of the absorber section 150. The second refrigerant solution 160, like the first refrigerant solution 158, includes a concentration of water and the hygroscopic substance, such as, for example, salt. The salt may be lithium bromide, lithium chloride or the like. More specifically, a refrigerant solution pump 162 is used to pump the first refrigerant solution 158 from the absorber section 150 to the generator section 160 through refrigerant line 164. The second refrigerant solution 160 flows (for example via being gravity fed) from the generator section 160 to the absorber section 150 through refrigerant line 166.

The absorber section 150, generator section 152 and condenser section 154 may operate at vacuum pressures (i.e., below atmospheric pressures), when the exhaust gas 124 is routed from the turbo-expander 126 and routed to the turbo-compressor 128. However, the absorber section 150 may operate at a lower vacuum pressure than the generator section 152 and condenser section 154. For example, the absorber section 150 may be operating at a vacuum pressure of approximately 0.1 atmospheres while the generator section 152 and condenser section 154 may be operating at a vacuum pressure of approximately 0.5 atmospheres. During operation, the water 161 in the flow of second refrigerant through line 166 gets absorbed by the hygroscopic material (e.g., salt) as it enters the absorber section 150 from the generator section 152 and gives off heat as it is absorbed. Accordingly, an absorber section heat exchanger 170 disposed in the absorber section 150 may be in fluid communication to, for example, a water tower 172 via a cooling tower coolant loop 186. The absorber section heat exchanger 170 is used to cool the water 161 of the second refrigerant solution 160 as it mixes with the first refrigerant solution 158 in the absorber section 150.

Though the open cycle absorption chiller system 114 has been described as operating in a vacuum, it is within the scope of this disclosure that the open cycle absorption chiller system 114 may not operate in a vacuum. For example, the open cycle absorption chiller system 114 may not be connected to a turbine generator 108, wherein the open cycle absorption chiller system 114 may be operating at pressures above one atmosphere.

The generator section 152 includes the generator section heat exchanger 156, which is operable to receive the flow of exhaust gas 124 from the turbo-expander 126. More specifically, in this example, the generator section heat exchanger 156 receives the exhaust gas 124 after it has flowed through the turbo-expander 126, the recycled plastic processing system 110 and the exhaust gas heat exchanger 112.

The generator section heat exchanger 156 is operable to remove heat from the flow of exhaust gas 124 and to transfer the heat to the second refrigerant solution 160 in order to evaporate water from the second refrigerant solution 160 and to generate a flow of steam 168 as the exhaust gas 124 passes through the generator section heat exchanger 156. Evaporating water from the second refrigerant solution 160 to generate the flow of steam 168, in turn, reduces the concentration of water in the second refrigerant solution. The flow of steam 168 includes a portion, if not all, of the same water absorbed from the flow of exhaust gas 124 by the first refrigerant solution 158 in the absorber section 150. Steam 168, as used herein, may be composed of substantially all water in its gas phase (e.g., water vapor) or may be composed of water in its gas phase and plus water droplets in liquid phase.

The condenser section 154 is operable to be in fluid communication with the flow of steam 168 from the generator section 152. The condenser section 154 includes a condenser section heat exchanger 174, which may also be in fluid communication with water tower 172 via the cooling tower coolant loop 186. Accordingly, the condenser section heat exchanger 174 of the condenser section 154 is operable to remove heat from the flow of steam 168 and to condense the flow of steam into a flow of liquid water 176. The flow of liquid water includes a portion, if not all, of the same water absorbed by the first refrigerant solution 158 from the flow of exhaust gas 124 in the absorber section 150.

A water pump 180 is in fluid communication with the condenser section 154. The water pump 180 is operable to pump the flow of liquid water 176 into a water tank 182.

Advantageously, this water 176 includes the water removed from the exhaust gas 124 as it passed through the absorber section 150. The water 176 is distilled due to its evaporation in the generator section 152 and may be easily and inexpensively processed into a distilled water product that meets commercial standards. Also advantageously, the open cycle absorption chiller system 114 operates such that the flow of water removed from the exhaust gas 124 in the absorber section 150 is balanced by the flow of water 176 condensed in the condenser section 154 and collected as distilled water 176 in the water tank 182.

Though the exemplary embodiments illustrated in the FIGS. depicts the exhaust gas 124 being routed through an open loop absorption chiller system 114 of a combined power system 100, it is within the scope of this disclosure that such an open loop absorption chiller system 114 may be used in other embodiments as well. For example, the exhaust gas 124 may be generated from a combustion process of a primary power system 102 and routed directly to the open loop absorption chiller system 114 without going through a bottoming cycle power system 104. Additionally, the combustion process may be generated from a source other than a primary power system 102, such as from a furnace system or from burning natural gas at an oil well site. In any of these cases, the open loop absorption chiller system 114 may be utilized to remove water from the exhaust gas 124 and/or cool the exhaust gas 124. Moreover, utilizing an open loop absorption chiller system 114 to remove water from exhaust gas 124 generated by a combustion process of, for example, a primary power system 102, may significantly enhance the efficiency of a carbon dioxide capture system 106, regardless of whether or not a bottoming cycle power system 104 is utilized.

Figure 3:
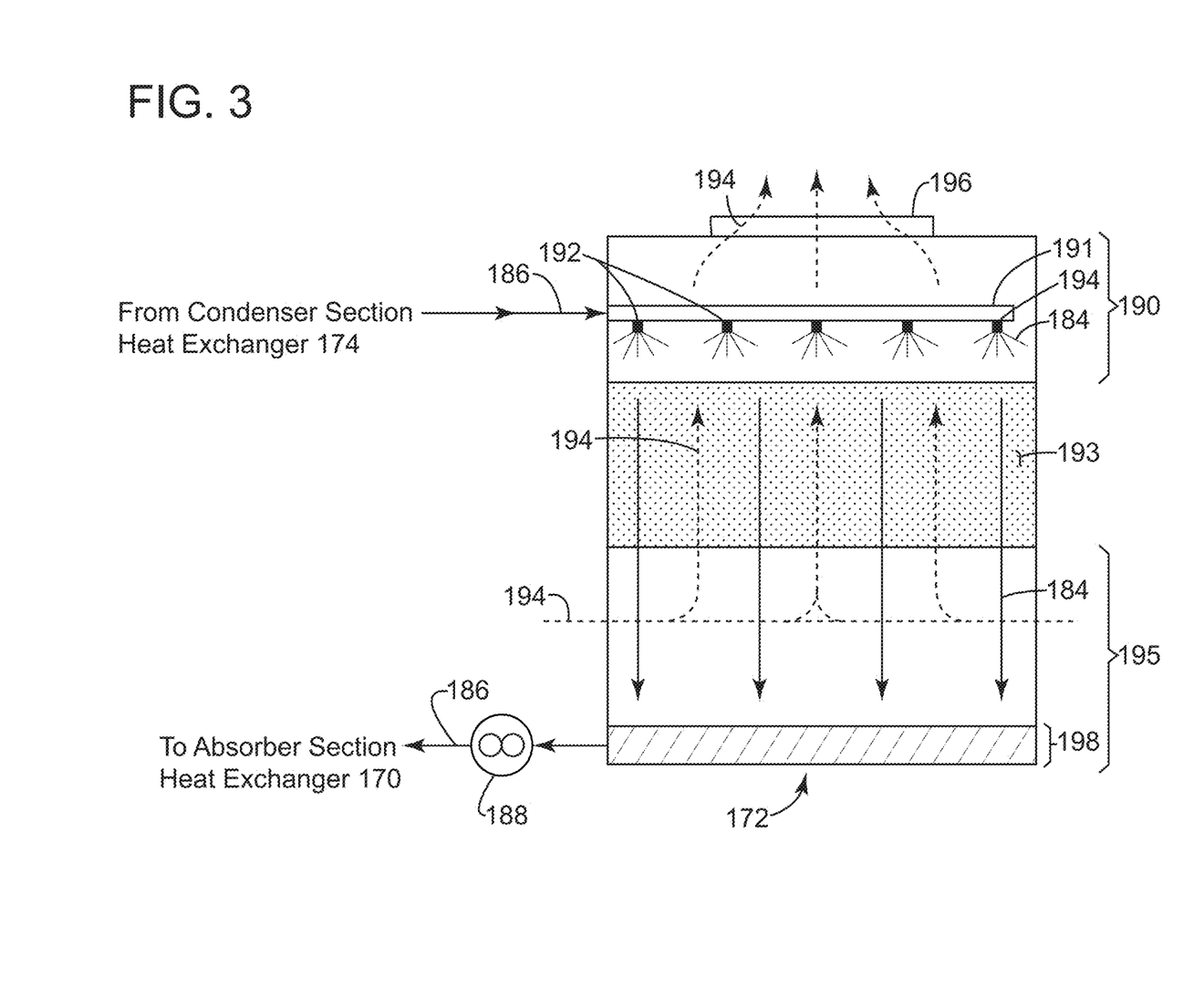
FIG. 3 depicts a schematic of an example of a detailed view of a cooling tower that may be used in the open cycle absorption chiller system of FIG. 2, in accordance with the present disclosure.

Referring to FIG. 3, a schematic is depicted of an example of a detailed view of the cooling tower 172 that may be used in the open cycle absorption chiller system 114, in accordance with the present disclosure. In this specific example, the cooling tower coolant fluid 184 that flows through the cooling tower coolant loop 186 is water. However, other cooling tower coolant fluids may also be used or included with the water, such as, for example, glycol or the like.

During operation, a cooling tower coolant pump 188 may be used to circulate the water (cooling tower coolant fluid) 184 through the cooling tower coolant loop 186 between the absorber section heat exchanger 170 of the absorber section 154 (see FIG. 2), the condenser section heat exchanger 174 of the condenser section 154 (see FIG. 2) and the water tower 172. The water 184 from the water tower 172 may enter the absorber section heat exchanger 170 in a range of about 70 to 90 degrees F. The water from the condenser section heat exchanger 174 may enter the upper portion 190 of the water tower 172 in a range of about 140 to 180 degrees F.

After passing through the absorber section 150 and condenser section 154, the heated water 184 will return to the upper portion 190 of the water tower 172 where the water enters the water tower's coolant distribution system 191. The coolant distribution system 191 will route the water 184 through a plurality of cooling tower nozzles 192, which will spray the water 184 onto a fill material 193. The fill material (or fill media) 193 is a material used to increase the surface area of the cooling tower 172. The fill material 193 may be, for example, knitted metal wire, ceramic rings or other materials that provide a large surface area when positioned or packed together within the cooling tower 172. The fill material 193 slows the water 184 down and exposes a large amount of water surface area to air-water contact.

Ambient air 194 is pulled through a lower portion 195 of the cooling tower 172 and out the upper portion 190 of the cooling tower 172 via a cooling tower fan 196. A small amount of water 184 evaporates as the air 194 and water 184 contact each other in the fill material 193, which cools the water. For example, the water 184 may be cooled down to a range of about 70 to 90 degrees F.

The cooled water 184 falls into a collection basin 198, which adds back make-up water to compensate for the small amount of water that has been evaporated during the evaporative cooling process. The cooled water 184 is then pumped through the cooling tower coolant loop 186 back to the absorber section heat exchanger 170 via the cooling tower coolant pump 188 to complete the refrigeration cycle.

The cooling tower 172 may be one of several types of cooling towers, such as crossflow cooling towers, counterflow cooling towers, open loop cooling towers, closed loop cooling towers or the like. However, they most often operate utilizing evaporative cooling produced from air to cooling tower coolant fluid (e.g., water) contact.

Figure 4:
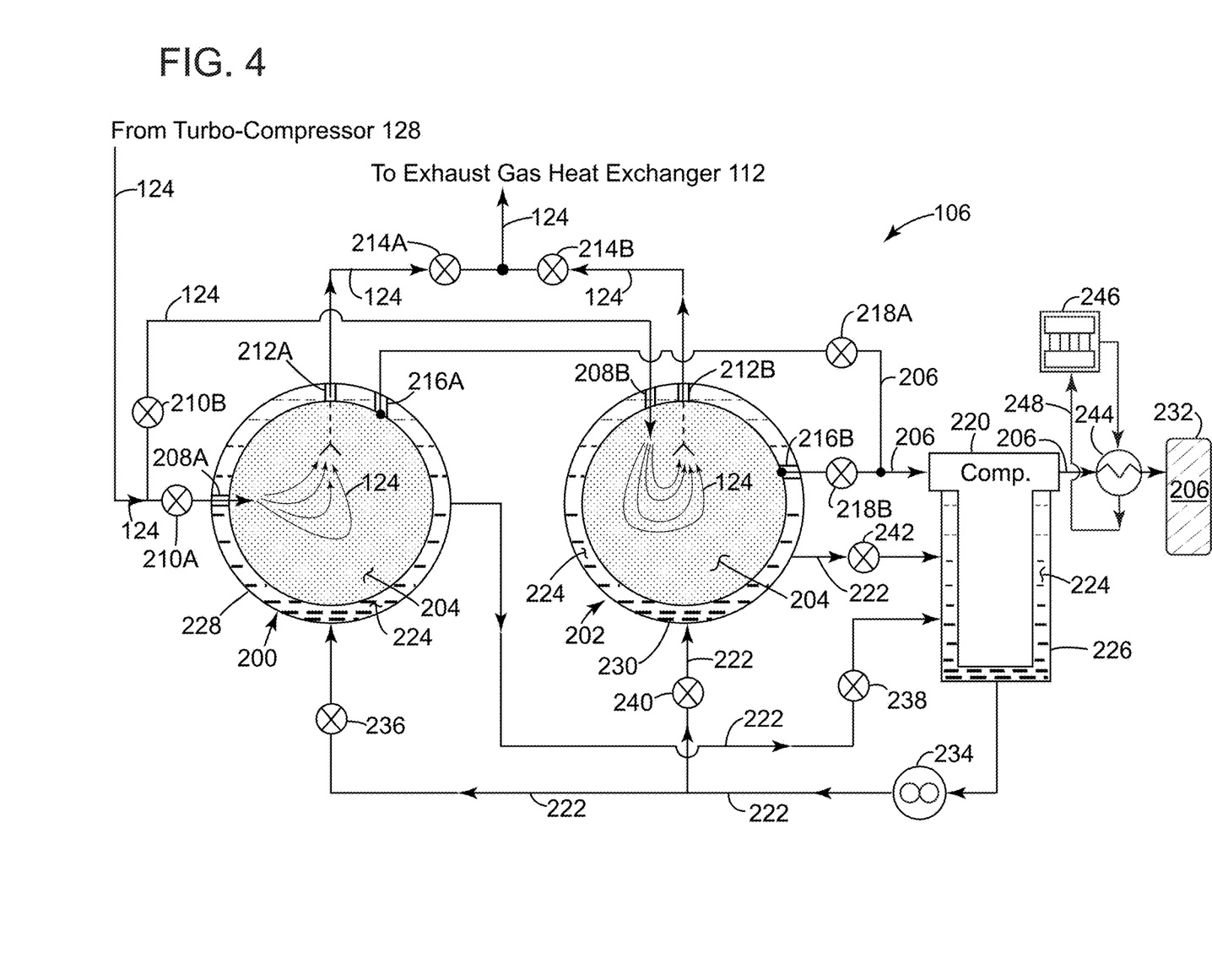
FIG. 4 depicts a schematic of an example of a detailed view of the carbon dioxide capture system of FIG. 1, in accordance with the present disclosure.

Referring to FIG. 4, a schematic is depicted of an example of a detailed view of the carbon dioxide capture system 106 utilized in the combined power system 100, in accordance with the present disclosure. As the exhaust gas 124 exits the turbo-compressor 128 it will undesirably contain carbon dioxide 206. To remove the carbon dioxide 206 prior to entering the exhaust gas heat exchanger 112, the carbon dioxide capture system 106 may be utilized.

The carbon dioxide capture system 106 includes a first capture tank 200 and a second capture tank 202. Each capture tank 200, 202 contains carbon dioxide absorbent material 204 operable to absorb carbon dioxide 206 from the exhaust gas 116. The carbon dioxide absorbent material may be zeolite, metal organic frameworks material, calcium hydroxide or the like.

It is important to note that because the exhaust gas 124 has passed through the hygroscopic material in the first refrigerant solution 158 of the absorber section 150 of the open cycle absorption chiller system 114 (see FIG. 2) prior to entering the carbon dioxide capture system 106, the concentration of water in the exhaust gas has been greatly reduced. For example, the concentration of water in the flow of exhaust gas 124 may be reduced to no more than 5.0 percent by weight, to no more than 2.5 percent by weight and/or to no more than 0.5 percent by weight before the flow of exhaust gas 124 enters the carbon dioxide capture system 106. Since water interferes with the absorption of carbon dioxide 206 by the carbon dioxide absorbent material 204, the efficiency of the carbon dioxide capture system 106 is advantageously enhanced by such reduction of the concentration of water in the exhaust gas 124.

Though the exemplary embodiments illustrated in the FIGS. depicts the exhaust gas 124 being routed through an open loop absorption chiller system 114 of a combined power system 100 prior to entering the carbon dioxide capture system 106, it is within the scope of this disclosure that such an open loop absorption chiller system 114 and carbon dioxide capture system 106 may be used in other embodiments as well. For example, the exhaust gas 124 may be generated from a combustion process of a primary power system 102 and routed directly to the open loop absorption chiller system 114, which may then be routed directly to the carbon dioxide capture system 106 without going through a bottoming cycle power system 104. Additionally, the combustion process may be generated from a source other than a primary power system 102, such as from a furnace system or from burning natural gas at an oil well site. Moreover, utilizing an open loop absorption chiller system 114 to remove water from exhaust gas 124 generated by a combustion process of, for example, a primary power system 102, may significantly enhance the efficiency of a carbon dioxide capture system 106, regardless of whether or not a bottoming cycle power system 104 is utilized.

The first and second capture tanks 200, 202 each include an exhaust gas inlet port 208A and 208B, which are selectively connectable to the flow of exhaust gas 124 from the turbo-compressor 128. In other words, the exhaust gas inlet ports 208A and 208B are selectively connectable to the flow of exhaust gas 124 prior to the exhaust gas passing through the carbon dioxide absorbent material 204. More specifically, flow valve 210A controls flow of exhaust gas 124 into the exhaust gas inlet port 208A of the first capture tank 200 and flow valve 210B controls flow of exhaust gas 124 into the exhaust gas inlet port 208B of the second capture tank 202.

The first and second capture tanks 200, 202 also include an exhaust gas outlet port 212A and 212B, which are selectively connectable to the second flow path 138 of the exhaust gas heat exchanger 112. In other words, the exhaust gas outlet ports 212A and 212B are selectively connectable to the flow of exhaust gas after the flow of exhaust gas has passed through carbon dioxide absorbent material. More specifically, flow valve 214A controls flow of exhaust gas 124 out of the exhaust gas outlet port 212A of the first capture tank 200 and into the second flow path 138 of the exhaust gas heat exchanger 112. Additionally, flow valve 214B controls flow of exhaust gas 124 out of the exhaust gas outlet port 212B of the second capture tank 202 and into the second flow path 138 of the exhaust gas heat exchanger 112.

The first and second capture tanks 200, 202 also include a carbon dioxide outlet port 216A and 216B, which are selectively connectable to a carbon dioxide compressor 220. More specifically, flow valve 218A controls flow of regenerated carbon dioxide 206 out of the carbon dioxide outlet port 216A of the first capture tank 200 and into the carbon dioxide compressor 220. Additionally, flow valve 218B controls flow of regenerated carbon dioxide 206 out of the carbon dioxide outlet port 216B of the second capture tank 202 and into the carbon dioxide compressor 220. The carbon dioxide compressor 220 is operable to pump carbon dioxide 206 out of the carbon dioxide outlet ports 216A, 216B that the carbon dioxide compressor 220 is connected to. The carbon dioxide compressor 220 may be a rotary screw type compressor, a piston compressor or the like.

A compressor coolant loop 222 is selectively connectable between the carbon dioxide compressor 220 and the first capture tank 200 or between the carbon dioxide compressor 220 and the second capture tank 202. The compressor coolant loop 222 is operable to flow a compressor coolant fluid 224 (such as water, glycol of the like) to remove a heat of compression from the compressor 220 and to transfer the heat of compression to the first or second capture tanks 200, 202. The heat of compression is operable to release a portion of the carbon dioxide 206 absorbed by the carbon dioxide absorbent material 204 in the first or second capture tanks 200, 202.

More specifically, the compressor coolant loop 222 includes a compressor coolant jacket 226 of the compressor 220, a first capture tank heating jacket 228 of the first capture tank 200 and a second capture tank heating jacket 230 of the second capture tank 202. The compressor coolant jacket 226 is operable to contain and circulate the compressor coolant fluid 224 around the outer surface of the compressor 220 to cool the compressor 220. The compressor coolant fluid 224 will remove the heat of compression from the compressor 220.

For purposes herein, a heating or coolant jacket (such as coolant jacket 226, and heating jackets 228 and 230) may refer to an outer casing or system of tubing, which holds fluid and through which the fluid circulates to cool or heat a vessel or device. For example, the compressor coolant jacket 226 may be a casing which surrounds the carbon dioxide compressor 220 to enable the coolant fluid to absorb the heat of compression and to cool the compressor 220. Also, the first and second capture tank heating jackets 228 and 230 may be casings or systems of tubing, which are operable to transfer the heat of compression to the selected first or second capture tanks 200, 202 and to heat the carbon dioxide 206 captured within the selected tank 200, 202.

The heating jackets 228 and 230 are operable to selectively contain and circulate the compressor coolant fluid 224 (which is heated with the heat of compression from compressor 220) around the outer surfaces of the first or second capture tanks 200, 202 respectively to heat the selected capture tank 200, 202. The compressor coolant fluid 224 will add the heat of compression to the selected capture tank 200, 202. The heat of compression from the compressor 220 will then advantageously be used to regenerate (or desorb) a portion, or substantially all, of the carbon dioxide 206 from the carbon dioxide absorbent material 204 so that it can be pumped by the compressor 220 into a holding tank 232 for later use and/or disposal.

A carbon dioxide heat exchanger 244 may be disposed between the holding tank 232 and the carbon dioxide compressor 220 to cool the carbon dioxide 206 prior to entering the holding tank 232. The carbon dioxide heat exchanger 244 may be cooled by a cooling tower 246 that circulates coolant fluid between the cooling tower 246 and the carbon dioxide heat exchanger 244 via carbon dioxide heat exchanger coolant loop 248.

The compressor coolant fluid 224 is pumped around the compressor coolant loop 222 via pump 234. Flow valves 236, 238, 240 and 242 control the flow of compressor coolant fluid 224 to either the first capture tank 200 or second capture tank 202. More specifically, when valves 236 and 238 are open, and valves 240 and 242 are closed, the coolant loop 222 circulates the coolant fluid 224 via pump 234 between the compressor 220 and the first capture tank 200. In this configuration, the compressor 220 is cooled and the first capture tank 200 is heated. When the valves 236 and 238 are closed, and valves 240 and 242 are open, the coolant loop 222 circulates the coolant fluid 224 via pump 234 between the compressor 220 and the second capture tank 202. In this configuration, the compressor 220 is cooled and the second capture tank 202 is heated.

During operation, the various flow valves may be configured such that the exhaust gas inlet port 208A of the first capture tank 200 is connected (i.e., in fluid communication) to the flow of exhaust gas 124 from the turbo-compressor 128. In other words, the exhaust gas inlet port 208A is connected to the flow of exhaust gas 124 prior to the exhaust gas 124 passing through the carbon dioxide absorbent material 204. Additionally, the first capture tank's exhaust gas outlet port 212A is connected (i.e., in fluid communication) to the second flow path 138 of the exhaust gas heat exchanger 112. In other words, the exhaust gas outlet port 212A is connected to the flow of exhaust gas 124 after the exhaust gas has passed through the carbon dioxide absorbent material 204. Additionally, the carbon dioxide compressor 220 may be connected to the carbon dioxide outlet port 216B of the second capture tank 202 and the compressor coolant loop 222 may be connected between the carbon dioxide compressor 220 and the second capture tank 202. In this configuration, exhaust gas 124 will flow into the first capture tank 200 to remove the carbon dioxide 206 from the exhaust gas 124 flow prior to entering the exhaust gas heat exchanger 112. Simultaneously, the heat of compression from the carbon dioxide compressor 220 will advantageously be used to heat the second capture tank 202 to regenerate the carbon dioxide from the second capture tank 202 and to pump the carbon dioxide 206 into the holding tank 232. By using the heat of compression of the carbon dioxide compressor 220 to regenerate the carbon dioxide in the second capture tank 202, the energy needed from external sources (such as electric heaters or the like) to regenerate the carbon dioxide is advantageously reduced.

Also during operation, the various flow valves may be configured such that the exhaust gas inlet port 208B of the second capture tank 202 is connected (i.e., in fluid communication) to the flow of exhaust gas 124 from the turbo-compressor 124. In other words, the exhaust gas inlet port 208B is connected to the flow of exhaust gas 124 prior to the exhaust gas 124 passing through the carbon dioxide absorbent material 204. Additionally, the second capture tank's exhaust gas outlet port 212B is connected (i.e., in fluid communication) to the second flow path 138 of the exhaust gas heat exchanger 112. In other words, exhaust gas outlet port 212B is connected to the flow of exhaust gas 124 after the exhaust gas 124 has passed through the carbon dioxide absorbent material 204. Additionally, the carbon dioxide compressor 220 may be connected to the carbon dioxide outlet port 216A of the first capture tank 200 and the compressor coolant loop 222 may be connected between the carbon dioxide compressor 220 and the first capture tank 200. In this configuration, exhaust gas will flow into the second capture tank 202 to remove the carbon dioxide 206 from the exhaust gas 124 flow prior to entering the exhaust gas heat exchanger 112. Simultaneously, the heat of compression from the carbon dioxide compressor 220 will advantageously be used to heat the first capture tank 200 to regenerate the carbon dioxide from the first capture tank 200 and pump the carbon dioxide into the holding tank 232. By using the heat of compression of the carbon dioxide compressor 220 to regenerate the carbon dioxide in the first capture tank 200, the energy needed from external sources (such as electric heaters or the like) to regenerate the carbon dioxide is advantageously reduced.

Figure 5:
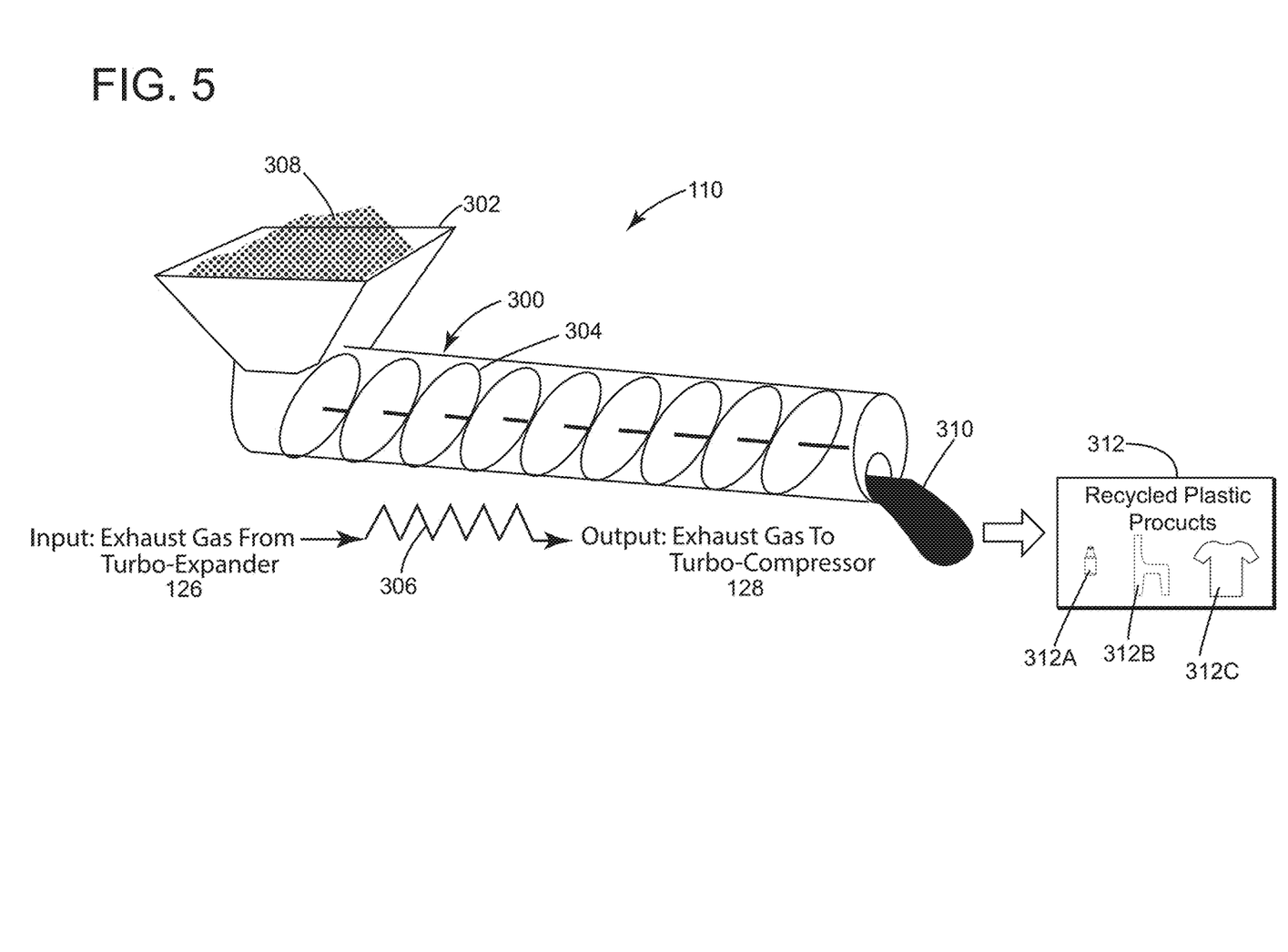
FIG. 5 depicts a schematic of an extruder of the recycled plastic processing system of FIG. 1, in accordance with the present disclosure.

Referring to FIG. 5, a schematic is depicted of an extruder 300 of the recycled plastic processing system 110 of FIG. 1, in accordance with the present disclosure. The recycled plastic processing system 110 is operable to receive the flow of exhaust gas 124 from the turbo-expander 124 and to route the flow of exhaust gas 124 to the exhaust gas heat exchanger 112, open cycle absorption system 114 and the turbo-compressor 128. The recycled plastic processing system 110 is operable to remove heat from the flow of exhaust gas 124 to melt solid recyclable plastic material 308 to provide a flow of molten recyclable plastic material 310. The molten recyclable plastic material 310 is operable to be cooled into a solid recycled plastic products 312, such as recycled plastic bottles 312A, plastic bags, plastic furniture 312B, plastic pipes, plastic tee shirts or other plastic clothing 312C, plastic auto parts or any other like plastic products that can be formed from the molten recyclable plastic material 310.

The extruder 300 includes a hopper section 302, an auger mechanism 304 and an extruder heat exchanger system 306. The hopper section 302 is operable to receive the solid recyclable plastic material 308 therein. The solid recyclable plastic material 308 may be ground up plastic material collected from industrial sources, residential sources, or the like. The auger mechanism 304 is operable to receive the solid recyclable plastic material 308 from the hopper section 302 and to compress the solid recyclable plastic material 308 therein.

The extruder heat exchanger system 306 is operable to receive the flow of exhaust gas 124 from the turbo-expander 126 and to route the flow of exhaust gas 124 to either of the exhaust gas heat exchanger 112, the open cycle absorption system 114 and the turbo-compressor 128. The extruder heat exchanger system 306 is operable to remove heat from the flow of exhaust gas 124 and to melt the solid recyclable plastic material 308 in the auger mechanism 304 to provide the flow of molten recyclable plastic material 310 as the solid recyclable plastic material 308 passes through the auger mechanism 304 and as the exhaust gas 124 passes through the extruder heat exchanger system 306.

The extruder heat exchanger system 306 may be a single heat exchanger that is operable to transfer heat directly from the exhaust gas 124 to the solid recyclable plastic material 308 in the auger mechanism 304. Alternatively, the extruder heat exchanger 306 may include a plurality of heat exchanger devices, that transfers the heat energy from the exhaust gas 124 in steps. For example, an exhaust gas to water heat exchanger may be used to transfer heat from the exhaust gas to a flow of water. Then a water to recyclable plastic heat exchanger may be used to transfer the heat energy from the flow of water to the solid recyclable plastic material 308 in the auger mechanism 304.

Though the exemplary embodiments illustrated in the FIGS. depicts the exhaust gas 124 being routed through a combined power system 100 prior to entering the recycled plastic processing system 110, it is within the scope of this disclosure that such a recycled plastic processing system 110 may be used in other embodiments as well. For example, the exhaust gas 124 may be generated from a combustion process of a primary power system 102 and routed directly to the recycled plastic processing system 110, without going through a bottoming cycle power system 104. Additionally, the combustion process may be generated from a source other than a primary power system 102, such as from a furnace system or from burning natural gas at an oil well site. Moreover, utilizing a recycled plastic processing system 110 to manufacture recycled plastic products from exhaust gas 124 generated by a combustion process of, for example, a primary power system 102, may significantly reduce the cost of manufacturing equivalent recycled plastic products from more conventional sources of heat, such as electric heat, regardless of whether or not a bottoming cycle power system 104 is utilized.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A bottoming cycle power system comprising:
a turbine-generator comprising a turbo-expander and turbo-compressor disposed on a turbo-crankshaft, wherein:
the turbo-expander is operable to rotate the turbo-crankshaft as a flow of exhaust gas from a combustion process passes through the turbo-expander, and
the turbo-compressor is operable to compress the flow of exhaust gas after the exhaust gas passes through the turbo-expander; and
an open cycle absorption chiller system comprising:
an absorber section operable to receive the flow of exhaust gas from the turbo-expander and to mix the flow of exhaust gas with a first refrigerant solution within the absorber section, the first refrigerant solution operable to absorb water from the exhaust gas as the exhaust gas passes through the first refrigerant solution, and the absorber section operable to route the flow of exhaust gas to the turbo-compressor after the flow of exhaust gas has passed through the first refrigerant solution.

2. The bottoming cycle power system of claim 1, wherein the turbine generator comprises a bottoming cycle generator disposed on the turbo-crankshaft, the bottoming cycle generator operable to generate electrical power when the turbo-crankshaft is rotated by the turbo-expander.

3. The bottoming cycle power system of claim 1, comprising the absorber section operable to reduce the concentration of water in the flow of exhaust gas to no more than 5.0 percent by weight before the flow of exhaust gas exits the absorber section.

4. The bottoming cycle power system of claim 1, wherein the open cycle absorption chiller system comprises:
a generator section operable to contain a second refrigerant solution in fluid communication with the first refrigerant solution of the absorber section, the generator section comprising a generator section heat exchanger operable to receive the flow of exhaust gas from the turbo-expander, the generator section heat exchanger operable to remove heat from the flow of exhaust gas to evaporate water from the second refrigerant solution and to generate a flow of steam as the exhaust gas passes through the generator section heat exchanger, the flow of steam comprising a portion of the same water absorbed from the flow of exhaust gas in the absorber section.

5. The bottoming cycle power system of claim 4, wherein the open cycle absorption chiller system comprises:
a condenser section operable to be in fluid communication with the flow of steam from the generator section, the condenser section operable to remove heat from the flow of steam and to condense the flow of steam into a flow of liquid water, the flow of liquid water comprising a portion of the same water absorbed from the flow of exhaust gas in the absorber section.

6. The bottoming cycle power system of claim 5, wherein the open cycle absorption chiller system comprises:
a water pump in fluid communication with the condenser section, the water pump operable to pump the flow of liquid water into a water tank.

7. The bottoming cycle power system of claim 1, comprising:
a recycled plastic processing system operable to receive the flow of exhaust gas from the turbo-expander and to route the flow of exhaust gas to the open cycle absorption system, the recycled plastic processing system operable to remove heat from the flow of exhaust gas to melt solid recyclable plastic material to provide a flow of molten recyclable plastic material, the molten recyclable plastic material operable to be cooled into a solid recycled plastic product.

8. The bottoming cycle power system of claim 7, wherein the recycled plastic processing system comprises an extruder, the extruder comprising:
a hopper section operable to receive the solid recyclable plastic material therein;
an auger mechanism operable to receive the solid recyclable plastic material from the hopper section and to compress the solid recyclable plastic material therein; and
an extruder heat exchanger system operable to receive the flow of exhaust gas from the turbo-expander and to route the flow of exhaust gas to the open cycle absorption system, the extruder heat exchanger system operable to remove heat from the flow of exhaust gas and to melt the solid recyclable plastic material in the auger mechanism to provide the flow of molten recyclable plastic material as the solid recyclable plastic material passes through the auger mechanism and as the exhaust gas passes through the extruder heat exchanger system.

9. The bottoming cycle power system of claim 7, wherein the turbine generator comprises a bottoming cycle generator disposed on the turbo-crankshaft, the bottoming cycle generator operable to generate electrical power to operate the recycled plastic processing system when the turbo-crankshaft is rotated by the turbo-expander.

10. The bottoming cycle power system of claim 7, comprising:
an exhaust gas heat exchanger comprising first and second flow paths operable to exchange heat therebetween, wherein:
the first flow path is operable to receive the flow of exhaust gas from the recycled plastic processing system prior to the exhaust gas being compressed by the turbo-compressor, and
the second flow path is operable to receive the flow of exhaust gas from the turbo-compressor after the exhaust gas has been compressed by the turbo-compressor.

11. The bottoming cycle power system of claim 10, wherein the first flow path of exhaust gas heat exchanger is operable to route the flow of exhaust gas to the open cycle absorption system.

12. The bottoming cycle power system of claim 1, comprising:
an exhaust gas heat exchanger comprising first and second flow paths operable to exchange heat therebetween, wherein:
the first flow path is operable to receive the flow of exhaust gas from the turbo-expander prior to the exhaust gas being compressed by the turbo-compressor, and
the second flow path is operable to receive the flow of exhaust gas from the turbo-compressor after the exhaust gas has been compressed by the turbo-compressor.

13. The bottoming cycle power system of claim 12, wherein the first flow path of exhaust gas heat exchanger is operable to route the flow of exhaust gas to the open cycle absorption system.

14. The bottoming cycle power system of claim 1, comprising a carbon dioxide capture system, the carbon dioxide capture system comprising:
a first and a second capture tank, each capture tank containing carbon dioxide absorbent material operable to absorb carbon dioxide from the exhaust gas, the first and second capture tanks each comprising:
an exhaust gas inlet port selectively connectable to the flow of exhaust gas from the turbo-compressor,
an exhaust gas outlet port selectively connectable to the second flow path of the exhaust gas heat exchanger, and
a carbon dioxide outlet port;
a carbon dioxide compressor selectively connectable to the carbon dioxide outlet port of either the first or second capture tank, the carbon dioxide compressor operable to pump carbon dioxide out of the carbon dioxide outlet port that the carbon dioxide compressor is connected to; and
a compressor coolant loop selectively connectable between the carbon dioxide compressor and the first capture tank or between the carbon dioxide compressor and the second capture tank, the compressor coolant loop operable to flow a compressor coolant fluid to remove heat of compression from the compressor and to transfer the heat of compression to the first or second capture tank, wherein the heat of compression is operable to release a portion of the carbon dioxide absorbed by the carbon dioxide absorbent material in the first or second capture tank.

15. A combined power system comprising:
a primary power system comprising an internal combustion engine having a rotatable crankshaft, the engine operable to use fuel in a combustion process to deliver primary power to the engine crankshaft, the combustion process producing a flow of exhaust gas; and
a bottoming cycle power system comprising:
a turbine-generator comprising a turbo-expander and turbo-compressor disposed on a turbo-crankshaft, wherein:
the turbo-expander is operable to rotate the turbo-crankshaft as the flow of exhaust gas from the combustion process passes through the turbo-expander, and
the turbo-compressor is operable to compress the flow of exhaust gas after the exhaust gas passes through the turbo-expander; and
an open cycle absorption chiller system comprising:
an absorber section operable to receive the flow of exhaust gas from the turbo-expander and to mix the flow of exhaust gas with a first refrigerant solution within the absorber section, the first refrigerant solution operable to absorb water from the exhaust gas as the exhaust gas passes through the first refrigerant solution, and the absorber section operable to route the flow of exhaust gas to the turbo-compressor after the flow of exhaust gas has passed through the first refrigerant solution.

16. The combined power system of claim 15, wherein the open cycle absorption chiller system comprises:
a generator section operable to contain a second refrigerant solution in fluid communication with the first refrigerant solution of the absorber section, the generator section comprising a generator section heat exchanger operable to receive the flow of exhaust gas from the turbo-expander, the generator section heat exchanger operable to remove heat from the flow of exhaust gas to evaporate water from the second refrigerant solution and to generate a flow of steam as the exhaust gas passes through the generator section heat exchanger, the flow of steam comprising a portion of the same water absorbed from the flow of exhaust gas in the absorber section.

17. The combined power system of claim 15, comprising the absorber section operable to reduce the concentration of water in the flow of exhaust gas to no more than 5.0 percent by weight before the flow of exhaust gas exits the absorber section.

18. A recycled plastic processing system comprising an extruder, the extruder comprising:
a hopper section operable to receive solid recyclable plastic material therein;
an auger mechanism operable to receive the solid recyclable plastic material from the hopper section and to compress the solid recyclable plastic material therein; and
an extruder heat exchanger system operable to receive a flow of exhaust gas from a combustion process, the extruder heat exchanger system operable to remove heat from the flow of exhaust gas and to melt the solid recyclable plastic material in the auger mechanism to provide a flow of molten recyclable plastic material as the solid recyclable plastic material passes through the auger mechanism and as the exhaust gas passes through the extruder heat exchanger system.

19. The recycled plastic processing system of claim 18, wherein the flow of exhaust gas is from a combustion process of a combined power system, the combined power system comprising:
an internal combustion engine having a rotatable crankshaft, the engine operable to use fuel in the combustion process to deliver primary power to the engine crankshaft; and
a bottoming cycle power system comprising:
a turbine-generator comprising a turbo-expander and turbo-compressor disposed on a turbo-crankshaft, wherein:
the turbo-expander is operable to rotate the turbo-crankshaft as the flow of exhaust gas from the combustion process passes through the turbo-expander, and the turbo-compressor is operable to compress the flow of exhaust gas after the exhaust gas passes through the turbo-expander and the extruder heat exchanger system.

20. The recycled plastic processing system of claim 19, wherein the turbine-generator comprises a bottoming cycle generator disposed on the turbo-crankshaft, the bottoming cycle generator operable to generate electrical power to operate the recycled plastic processing system when the turbo-crankshaft is rotated by the turbo-expander.

21. An open cycle absorption chiller system comprising:
an absorber section operable to receive a flow of exhaust gas from a combustion source and to mix the flow of exhaust gas with a first refrigerant solution within the absorber section, the first refrigerant solution operable to absorb water from the exhaust gas as the exhaust gas passes through the first refrigerant solution, and the absorber section operable to route the flow of exhaust gas out of the absorber section after the flow of exhaust gas has passed through the first refrigerant solution.

22. The open loop absorption chiller system of claim 21, comprising the absorber section operable to reduce the concentration of water in the flow of exhaust gas to no more than 5.0 percent by weight before the flow of exhaust gas exits the absorber section.

23. The open loop absorption chiller system of claim 21, wherein the combustion source is a primary power system.

24. The open cycle absorption chiller system of claim 21 comprises:
a generator section operable to contain a second refrigerant solution in fluid communication with the first refrigerant solution of the absorber section, the generator section comprising a generator section heat exchanger operable to receive the flow of exhaust gas from the combustion source, the generator section heat exchanger operable to remove heat from the flow of exhaust gas to evaporate water from the second refrigerant solution and to generate a flow of steam as the exhaust gas passes through the generator section heat exchanger, the flow of steam comprising a portion of the same water absorbed from the flow of exhaust gas in the absorber section.

* * * * *